Jan. 18, 1966  E. J. HELLUND  3,230,506
PRESSURE PULSATION GENERATOR
Filed Feb. 26, 1962
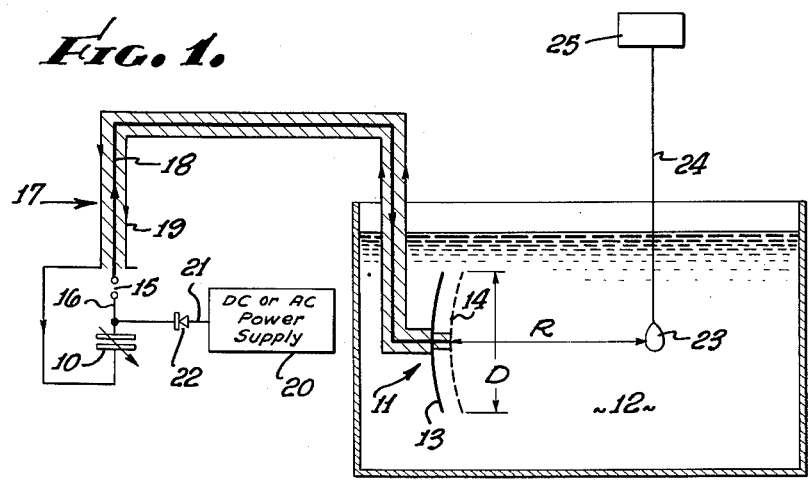
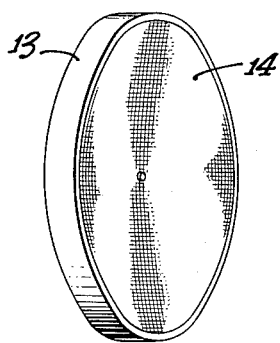
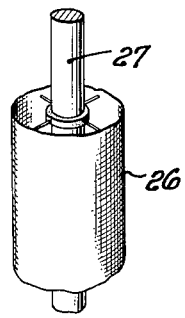
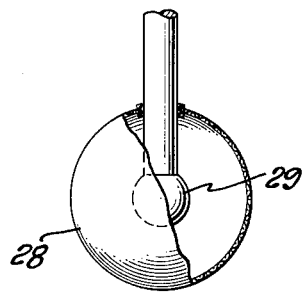
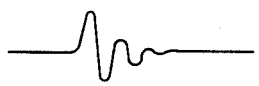
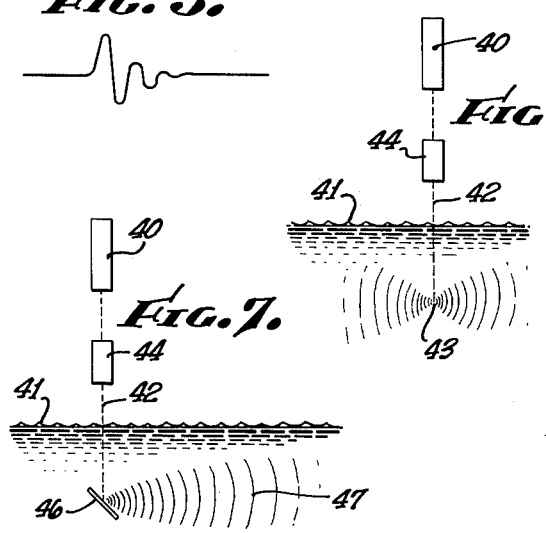
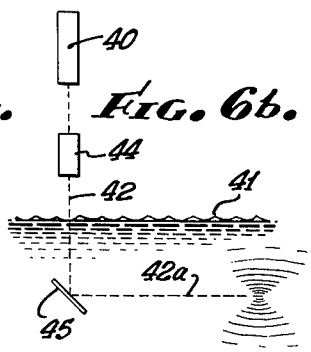
INVENTOR.
EMIL J. HELLUND
BY Whit and Haeflig
ATTORNEYS.

United States Patent Office 3,230,506
Patented Jan. 18, 1966

3,230,506
PRESSURE PULSATION GENERATOR
Emil J. Hellund, South Laguna, Calif., assignor, by mesne assignments, to MHD Research, Inc., a wholly-owned subsidiary of Hercules Powder Company, a company of Delaware
Filed Feb. 26, 1962, Ser. No. 176,188
4 Claims. (Cl. 340—12)

This invention relates generally to the generation of pressure pulsations in different type media through the application or injection of thermal energy into the media. More particularly, the invention concerns apparatus and methods for generating acuostic pulses through the injection of thermal energy into the characteristic medium causing the latter to expand and contract, and preferably without change of phase, locally and controllably, phase in this sense referring to physical condition as a liquid or a gas.

Referring first to the broader aspects of the invention, the inventive method of generating acoustic pulses may be characterized as including the steps of positioning a source of energy in proximity to the medium or substance transmitting the pulses, and injecting energy from the source into a local region of the substance so as to create local thermal expansion and contraction thereof productive of high frequency pulsations traveling in the substance. The source of energy, and means for injecting energy from the source into the substance, may take various forms as will be described. Thus, where the energy injection is characterized as electrothermal, the energy source may for example include capacitance subject to charging and controllable discharge to an energy injector or transducer positioned in the medium such as liquid. Such a transducer may have electrodes immersible in the liquid medium and spaced for transmitting a high frequency electrical current pulse from the source to the liquid in the space between the electrodes.

Other type energy injectors may include equipment for generating and directing into liquid a pulsed beam of electromagnetic radiation having frequency characteristics such that the beam penetrates into and is asborbed by the liquid to produce local thermal expansion and contraction. Still another type means for injecting energy into a medium such as liquid may include equipment for generating and directing into the liquid a pulsed beam of high energy particles as will be described. Additional objects of the invention have to do with the control of the energy injection into the liquid or other medium in such manner so as to control the acoustic pulsations transmitted in the liquid for purposes such as signal transmission. The methods and apparatus of the present invention are contemplated as having significant applications in underwater acoustics and undersea warfare, possible applications including torpedoes, ships, submarines, sea bottom mounted sound projectors, helicopter transported dipping sound sources, and the like.

These and other objects and advantages of the invention, as well as the details of an illustrative embodiment, will be more fully understood from the following detailed description of the drawings, in which:

FIG. 1 is an elevational showing of apparatus for injecting energy from a source into liquid, the apparatus incorporating a current-passage transducer immersed in the liquid;

FIG. 2 is a perspective showing of a transducer such as may be used in the FIG. 1 system;

FIG. 3 illustrates the wave form of an acoustic pulse transmitted in the FIG. 1 liquid and suitably detected;

FIG. 4 shows another form of current-passage transducer usable in the FIG. 1 system;

FIG. 5 shows still another type current-passage transducer usable in the FIG. 1 system;

FIGS. 6a and 6b show the manner in which energy may be injected into liquid or other media from a distance for creating pressure pulsations in the media; and FIG. 7 shows apparatus of the same type as illustrated in FIG. 6 but utilizing in addition an energy absorber placed in the liquid, the absorber in turn acting as a transducer to inject absorbed energy into the liquid or other media in a changed directional sense.

Referring first to FIGS. 1–3 the source of electrical energy illustrated includes a capacitor 10 which may be variable, the capacitor being operable to store electrical energy and to discharge such energy to the transducer generally indicated at 11. The transducer is immersed in a body of liquid 12 such as water and it is characterized as being of the current-passage type. The transducer has first and second electrodes 13 and 14, these being dished, spaced apart and sized so as to provide the desired resistance to the discharge of the capacitor, and also to provide the desired directivity of the acoustic pulse transmitted in the liquid 12. The electrode 13 may comprise a plate as shown whereas the electrode 14 may comprise a screen having the same or approximately the same dished shape and size as the plate. Elements equivalent to the screen and plate electrodes may be substituted, where such elements function to cause directional transmission of acoustic pulses in the pulse transmitting medium.

The means for injecting energy from the capacitor 10 to the liquid 12 also includes a spark gap switch 15 connected in series with the capacitor as by a lead 16, and a coaxial lead 17 having lead elements 18 and 19, the former being electrically connected in series between the switch 15 and the screen 14, and the latter being electrically connected in series between the capacitor 10 and the other electrode 13 of the transducer. The source of electrical energy may also include a D.C. or A.C. power supply 20 suitably connected in energy transmitting relation to the capacitor, as for example by a lead 21 running between the power supply and the lead 16 typically through a rectifier 22.

In operation, a current pulse may be considered as passing through the lead element 19 to the screen electrode 14 and then to the backplate 13, causing the electrically conducting sea water or other liquid to thermally expand and contract, without change of phase (i.e., physical condition as a liquid), creating a sound pulse, the screen front plate of the transducer being poorly coupled to the water allowing the sound to pass through the screen. Where the plates of electrodes 13 and 14 are formed as spherical shell segments, the sound is produced in phase (referring to wave analysis) and constructively interferes at the focal point at which a suitable detector or hydrophone 23 may be located. The detected signal may be led at 24 from the hydrophone to a suitable device 25, such as a recorder or oscilloscope, where the detected pulse may be registered or otherwise observed.

For higher efficiencies the pulse length may be selected by varying parameters such as the diameter of the dished plate 13 and screen 14 and the space therebetween so as to provide the proper resistance to slightly under-damp the discharge of the capacitor. As an example of actual operation the diameter of the electrodes 13 and 14 may be 30 centimeters with 1 centimeter spacing therebetween, the capacitor being rated at 29.4 mf. and 15 kv. The elements or electrodes 13 and 14 were formed into a 75 cm. radius sphere providing a focal point at 75 cm. It was found that the discharge oscillated approximately 1.5 cycles at a 38.5 kc. rate. A directivity plot of the transducer was obtained by rotating the transducer about a vertical axis and recording the peak pressure at each angular position and at the focal distance. The transducer showed a 30 db gain in the forward direction, with peak absolute sound pressure at the focus of 121.5 db ref 1 dyne/cm.² This corresponds to a peak pressure of $1.18 \times 10^6$ dynes/cm.² at the focus, these sound levels being made with only 375 joules energy storage. A pulse trace detected at the focus is illustrated in FIG. 3.

While the discharge of the capacitor is not a perfect RC type decay, it is sufficiently close to permit determination of the characteristic decay time of the capacitance discharge in accordance with the following equation in order to substantially maximize the acoustic wave amplitude for detection:

$$\tan^{-1}(2\pi f t_d) = \pi/2 \qquad (1)$$

where $f$ = cut-off frequency of the detector
$t_d$ = characteristic decay time of the capacitance discharge The above expression is obtained from the expression:

$$P_m = P_b [2/\pi \tan^{-1}(2\pi f t_d)]$$

where $P_m$ is the measured pressure peak and
$P_a$ is the pressure peak if measured with an infinite bandwidth hydrophone.

It is clear that $P_m$ will be maximized under the condition expressed in Equation 1.

The acoustic efficiency of a pulsed thermal injection can be calculated and is found to be:

$$\eta = \frac{1}{1+l}$$

$$l = \pi \rho c_s (C_h/\alpha v)^2 \tau^3 / E$$

$\rho c_s$ = acoustic impedance of the medium (gm./cm.²/sec.)
$C_H$ = specific heat of the medium (joules/gm./deg.)
$\alpha v$ = bulk coefficient of thermal expansion of the medium (deg.$^{-1}$)
$E$ = energy injected per pulse (joules $\times 10^{-7}$)
$\tau$ = pulse length (sec)

If an efficiency equal to or greater than 50% is required $$l \leq 1 \text{ or } \frac{T^3}{E} \leq \frac{1}{\pi \rho c_s}\left(\frac{\alpha v}{C_H}\right)^2$$

Substituting the following approximate values for water at 15° C.:

$\rho = 1$ $C_H = 4.18 \dfrac{\text{joules}}{\text{gm.}^\circ \text{C.}}$ $\dfrac{\tau^3}{E} \leq 0.73 \times 10^{-14}$ sec.³/joule $c_s = 1.44 \times 10^5$ cm./sec.
$\alpha V = 0.24 \times 10^{-3}/^\circ$ C.

Tabulating:

| $\tau$ (Sec.) | $1/\tau$ | $E \times 10^{-7}$ (Joules) | $E/\tau \times 10^{-7}$ (Watts) |
|---|---|---|---|
| $10^{-2}$ | 100 | $137 \times 10^6$ | $137 \times 10^8$ |
| $10^{-3}$ | 1,000 | $137 \times 10^3$ | $137 \times 10^6$ |
| $10^{-4}$ | 10,000 | 137 | $137 \times 10^9$ |

Since $\tau$ is frequency-related, it can be seen that the energy requirements are reasonable in useful frequency ranges. In the dish-shaped transducer described above, $\tau = 1 \div 40{,}000$ and $E = 375$ joules.

Accordingly, efficiencies can be in the useful range. Since the efficiency is energy dependent it is clear that sound generation is not a linear function of successively generated signals. Generation of low frequency sound is more efficient as an intermittent amplitude modulated series of short pulses, than a single slowly varying CW signal.

The transducer 11 may have a parabolic shape as shown in FIG. 2 rather than a spherical segment configuration, in order to produce parallel acoustic beams for underwater sound transmission. Many other types or shapes of transducers may be formed, two of such being illustrated in FIGS. 4 and 5. In the former, the screen electrode 26 is generally cylindrical about a rod shaped solid surface electrode 27 corresponding to the plate 13 in FIG. 1. In FIG. 5 the screen electrode 28 is spherical about a ball shaped solid surface electrode 29 to act as a point source. The FIG. 4 arrangement may be considered as an extended or line source of acoustic waves radiating perpendicularly from the common axis of the electrodes 26 and 27.

The equation for the pressure generated by thermal expansion is $$P_\text{thermal} = \left[\frac{1}{4\pi}\rho \frac{\alpha v}{C_H}\frac{d}{dt}(I^2 R)\right]D^{-1}$$

where $\alpha v$ = coefficient of thermal expansion (bulk)
$\rho$ = density of medium
$C_H$ = specific heat
$D$ = distance at which pulse detected
$I$ = electrical current (amperes)
$R$ = electrical resistance (ohms)

One can see that if a substance had a greater $\alpha v$, smaller $C_H$, and substantially the same $\rho$ as sea water, then the pressure would be higher than for sea water. The effect would be a higher efficiency at lower frequencies. Some of the substances that fall into this category are paraffin, polyethylene, polystyrene, and some rubbers. The energy may be fed to the substances if they were rendered electrically-conducting by loading them with carbon or imbedding small wires in the materials. Also radiation is a possible way to add energy to the materials.

Referring now to FIGS. 6 and 7 these show other means for injecting heat into substance for producing thermal expansion and contraction of the substance productive of high frequency pressure pulsations traveling therein. One such means includes equipment generally designated at 40 for generating and directing into the liquid a pulsed beam of electromagnetic radiation, and having frequency characteristics such that the beam penetrates into and is absorbed by the substance 41, such as liquid, to produce the desired local thermal expansion and contraction thereof. In the case where the substance 41 comprises water, it is desirable that the electromagnetic radiation indicated by the beam 42 have the property of penetrating the water or liquid to some depth. Normally, such penetration necessitates working with radiation in the visible or ultra-high energy portion of the spectrum, that is X-ray and γ-ray. Beyond the visible, in the near infra-red and longer wave lengths, radiation is poorly penetrating and generally unsuitable for acoustic signal generation.

Any electromagnetic radiation beamed into a limited domain in the water as indicated at 43 will be progressively absorbed and the amount of such absorption will be near minimum for green wave lengths, i.e., around 5300 A., the absorption increasing for both longer and shorter wave lengths. Accordingly, deeper penetration by the radiation, as facilitated by the use of green wave lengths, may be considered desirable to generate sound below the surface layers of the liquid as indicated at 44. Typically, coherent radiation in the spectral green is desirable for efficient production of the subsurface acoustic pulsations. Such radiation may be generated by what is known as a laser, that is an optical maser producing stimulated emission of radiation as described in the article, "Optical Masers," published in Scientific American, June 1961, and in the bibliography references to that article. Also useful is non-coherent radiation such as may be spark generated and in the spectral green. The device 44 in the path of the beam emanating from the laser 40 may comprise a chopper or other suitable device for pulsing the beam 42 at the desired controllable pulse frequency.

FIG. 6b shows the same elements as illustrated in 6a together with a new element comprising a reflector 45 positioned in the liquid 41 and in the path of the beam 42 for reflecting the latter as indicated at 42a. Generation of sound may be caused to occur at or along the locus of the beam 42a, through the use of the reflector 45.

FIG. 7 shows the same elements as illustrated in FIG. 6a with the addition of an absorber 46 immersed in the liquid 41 and in the path of the beam 42 penetrating the liquid. The absorber, which may for example comprise a sheet of carbon black, acts as a black body acceptor of the radiation, which is locally heated during the beam pulse intervals to produce expansion and contraction of the liquid adjacent the absorber sheet or materials, thereby generating acoustic waves indicated at 47.

It is believed clear from the foregoing that modulated electromagnetic radiation can be projected from aircraft, submarines, ships, torpedoes and the like into sea water, to become absorbed and producing modulated underwater sound. Such a system may be considered to incorporate a transducer, thereby obviating the penalties of weight, drag and hydrodynamic noise associated with a solid transducer in contact with water. In addition to the mentioned lasers and spark discharges, sources of electromagnetic radiation may include exploding wires and xenon flash lamps.

The device 40 illustrated in FIGS. 6 and 7 may alternatively comprise equipment for generating and directing into the liquid a pulsed beam of high energy particles such as electrons or ions or neutron particles, emanations of natural or artificial radioactive materials, nuclear reactor power pulsations and the like.

Finally, referring back to FIGS. 1–5, the heat injection may be carried out in such a manner as to realize amplitude and frequency modulation of thermally generated acoustic signals. If the signal received by the detector 23 is to be detected as the envelope of a series of pulsed signals, amplitude modulation may be accomplished by varying the strength of each pulse in accordance with the efficiency expression previously mentioned. Typically but not necessarily the capacitance of the capacitor 10 may be varied to change the strength of each pulse if desired. Frequency modulation may typically be accomplished by controlling the interval between pulses such as by controlling the frequency of the A.C. power supply 20. Electronically, it is possible to generate the inverse of a direct thermal modulation accompanied by frequency doubling. If a carrier frequency is employed along with the acoustic signal used to convey information, one can use the difference frequency of the acoustic signal and recover the information directly. Amplitude and frequency modulation in this case are accomplished by direct modulation of electric current in a transducer which provides joule heating of the liquid.

I claim:

1. Apparatus of the character described, comprising a source of electrical energy, and means for injecting energy from said source into liquid for producing local thermal expansion and contraction of the liquid without change of phase thereof and productive of a high frequency pressure pulsation traveling in the liquid, said means including a transducer having electrodes immersible in the liquid and spaced for transmitting an electrical current pulse at a high frequency to the liquid in the interelectrode space, one electrode having a large number of closely spaced perforations to freely pass the pulse traveling in the liquid and the other electrode being substantially imperforate, both of said electrodes being arcuate to effect a predetermined directional pattern of pressure pulsation travel in the liquid, said source including a capacitor for storing electrical energy and for discharging said energy to said transducer, and said means including a spark gap switch, both said electrodes, said capacitor and said switch being electrically connected in a circuit.

2. The invention as defined in claim 1 in which the electrode spacing is selected to provide liquid resistance to electrical current flow for slightly under-damping the current surge.

3. The invention as defined in claim 1 in which the electrodes are dished to effect said predetermined directional pattern of acoustic wave travel in the liquid, the acoustic wave pressure generated by thermal expansion of the liquid being approximately proportional to the expression $$\frac{1}{4\pi}\rho\frac{\alpha v}{C_H}\frac{d}{dt}(I^2 R)D^{-1}$$

where $\alpha v$ = coefficient of thermal expansion of the liquid (bulk)
$\rho$ = density of the liquid
$C_H$ = specific heat of the liquid
$D$ = distance of wave front from electrodes
$I$ = electrical current at electrodes (amperes)
$R$ = electrical resistance at electrodes (ohms)

4. The invention as defined in claim 1 in which said means includes a coaxial lead having first and second lead elements one of which is electrically connected in series between said switch and one electrode of the transducer and the other of which is electrically connected in series between said capacitor and another electrode of the transducer.

References Cited by the Examiner

UNITED STATES PATENTS

| | | | |
|---|---|---|---|
| 1,152,697 | 9/1915 | Bodde | 340—12 |
| 1,173,957 | 2/1916 | Hahnemann | 340—4 |
| 1,641,664 | 9/1927 | De Forest | 340—12 |
| 1,718,303 | 6/1929 | Orr | 219—292 |
| 1,806,745 | 5/1931 | De Forest. | |
| 2,483,768 | 10/1949 | Hershberger | 325—26 |
| 2,836,033 | 5/1958 | Marrison | 310—4 X |
| 2,884,375 | 4/1959 | Seelig et al. | |
| 2,946,217 | 7/1960 | Fruengel. | |
| 3,141,099 | 7/1964 | Brandon | 340—12 X |

FOREIGN PATENTS 4,967   6/1910   Great Britain.

OTHER REFERENCES

Electronics, June 9, 1961, vol. 34, No. 23, pp. 24, 25 relied on.

CHESTER L. JUSTUS, *Primary Examiner.*

R. A. FARLEY, *Assistant Examiner.*